US011937571B2

(12) United States Patent
Swope et al.

(10) Patent No.: US 11,937,571 B2
(45) Date of Patent: Mar. 26, 2024

(54) ANIMAL IDENTIFICATION SYSTEM

(71) Applicant: RapID Lab, Inc., San Francisco, CA (US)

(72) Inventors: Mark Swope, San Francisco, CA (US); Bretton Mark Swope, San Francisco, CA (US); Vanessa Lai, San Francisco, CA (US)

(73) Assignee: RapID Lab, Inc., San Francisco, CA (US)

( * ) Notice: Subject to any disclaimer, the term of this patent is extended or adjusted under 35 U.S.C. 154(b) by 265 days.

(21) Appl. No.: 17/300,310

(22) Filed: Aug. 9, 2021

(65) Prior Publication Data

US 2023/0040460 A1 Feb. 9, 2023

(51) Int. Cl.
*A01K 11/00* (2006.01)

(52) U.S. Cl.
CPC .................................. *A01K 11/002* (2013.01)

(58) Field of Classification Search
CPC ........ A01K 11/001–004; A01K 13/003; A61B 17/3468; A61B 17/1285; A61B 17/122; A61B 90/90
See application file for complete search history.

(56) References Cited

U.S. PATENT DOCUMENTS 3,641,804 A * 2/1972 Oudenhoven ........ A01K 11/002 72/409.01
3,826,160 A * 7/1974 Allen .................. A01K 11/002 81/418
4,368,735 A * 1/1983 Filmer ................ A01K 11/002 606/117
4,402,320 A * 9/1983 Filmer ................ A01K 11/002 606/117
4,696,119 A * 9/1987 Howe .................. A01K 11/001 606/117

* cited by examiner

*Primary Examiner* — Erich G Herbermann
(74) *Attorney, Agent, or Firm* — Run8 Patent Group, LLC; Peter Miller

(57) ABSTRACT

An animal identification system includes: a tray defining a set of tag receptacles; a set of tags, each tag defining a tag base and a barb and located in a tag receptacle in the tray; a set of backing plates, each backing plate defining a receiver and located in a tag receptacle in the tray with the receiver coaxial with a barb of a corresponding tag occupying the tag receptacle; and an applicator configured to insert into a tag receptacle in the tray, to retrieve a tag and a backing plate from the tag receptacle while maintaining a receiver of the backing plate coaxial with a barb of the tag, and to pierce an appendage of an animal and assemble the backing plate onto the barb of the tag in a continuous actuation motion.

11 Claims, 7 Drawing Sheets

ANIMAL IDENTIFICATION SYSTEM

CROSS-REFERENCE TO RELATED APPLICATIONS

This application is related to U.S. patent application Ser. No. 14/614,328, filed on 4 Feb. 2015, which is incorporated in its entirety by the reference.

TECHNICAL FIELD

This invention relates generally to the field of animal identification and more specifically to a new and useful animal identification system in the field of animal identification.

DESCRIPTION OF THE EMBODIMENTS

Figure 1:
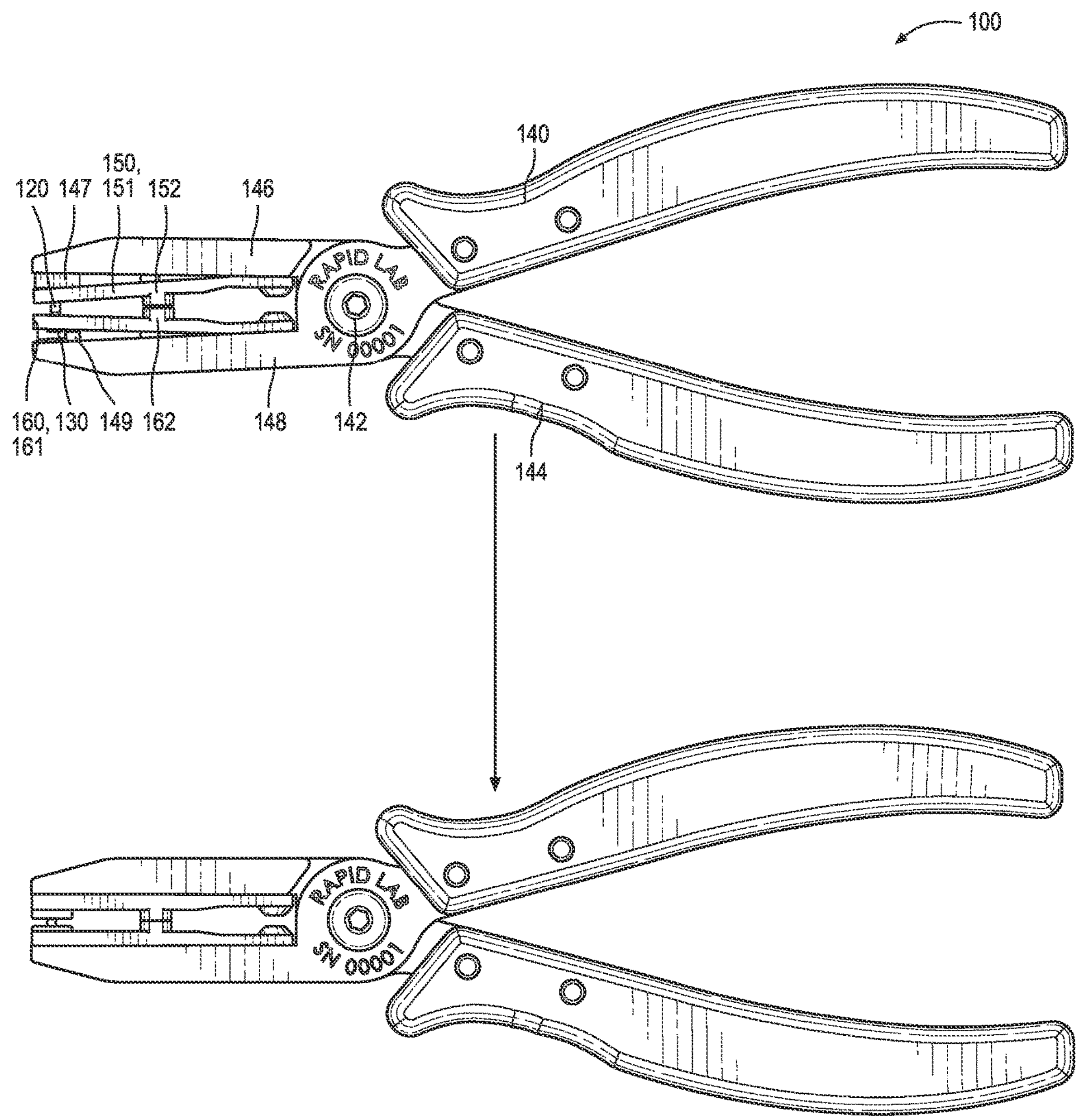
FIG. 1 is a flowchart representation of a system.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

As shown in FIGS. 1-5, an animal identification system 100 includes: a tray 110 defining a set of tag receptacles 112; a set of tags 120, each tag defining a tag base 121 and a barb 122 and located in a tag receptacle 112 in the tray 110; a set of backing plates 130, each backing plate 130 defining a receiver and located in a tag receptacle 112 in the tray 110 with the receiver coaxial with a barb 122 of a corresponding tag occupying the tag receptacle 112; and an applicator 140 configured to insert into a tag receptacle 112 in the tray 110, to retrieve a tag and a backing plate 130 from the tag receptacle 112 while maintaining a receiver of the backing plate 130 coaxial with a barb 122 of the tag 120, and to pierce an appendage of an animal and assemble the backing plate 130 onto the barb 122 of the tag 120 in a continuous actuation motion.

2. Applications

Generally, the system 100 can include: a set of identifier tags containing visual and/or digital identifying information loaded into a tray 110 with their corresponding backing plates; and an applicator 140 configured to assemble each tag with its corresponding backing plate onto an ear of an animal (e.g., a mouse or other rodent).

In particular, the tray 110 can locate a row of tags and a set of backing plates 130 defining tag receivers 132 coaxially aligned with barbs 122 of their corresponding tags. The applicator 140 can include a pair of tongues configured: to insert into a tag receiver 132 in the tray 110; to concurrently engage a tag and its corresponding backing plate in the tag receptacle 112; to extract the tag 120 and backing plate from the tag receptacle 112; to maintain the tag receiver 132 of the backing plate 130 coaxial with the barb 122 of the tag 120 once removed from the tag receptacle 112; and to drive the barb 122 through the ear of a mouse and into the tag receiver 132 of the backing plate 130; and to automatically release the tag 120 and backing plate and stop application of any further force into the mouse's ear just as the barb 122 fully inserts and locks within the tag receiver 132 of the backing plate 130. The applicator 140 can therefore prevent damage to the mouse's ear while enabling an operator (e.g., a lab technician) to rapidly tag the mouse with a single loading operation (e.g., inserting the applicator 140 into a tag receptacle 112 in the tray no) followed by a single applicator 140 actuation (e.g., a single "squeeze" motion of the applicator 140).

For example, the system 100 can include small tags defining small tag bases 121 (e.g., 3.5 millimeters by 3.5 millimeters) that are sufficiently small for deployment on small, young rodents, such as mice between five and seven days of age. The tongues of the applicator 140 can also define small cross-sections—configured to interface with these tag and backing plates—to enable an operator to place a tag near the base of a mouse's skull such that the tag 120 remains in a comfortable position for the mouse as the mouse grows.

The system 100 is described herein as a tag, tag organization, and tag application system for identifying small rodents, such as when genotyping a batch of young mice. However, the system 100 can be implemented by an operator, etc. to tag large rodents or other animals.

3. Tag

In one implementation, a tag includes: a rectilinear tag base 121, such as a square base or square base with fileted or chamfered corners; and a barb 122 extending rearward from (the center of) the tag base 121; and an identifier element.

In this implementation, the barb 122 includes: a shoulder 124 of a first diameter and configured to insert into a tag receiver 132 (i.e., a bore) of a backing plate; and a barb tip 123 arranged on a distal end of the shoulder 124 opposite the tag base 121, defining a maximum width greater than the diameter of the shoulder 124, and configured to retain the backing plate 130 on the shoulder 124.

The identifier element: contains a unique visual (e.g., optical) and/or wirelessly transmitted digital identifier; and is (over)molded into the base of the tag 120. For example, the identifier element can include: an anodized aluminum (or enameled steel, etc.) plate etched to depict a QR code (or 2D DATAMATRIX code, etc.); a painted aluminum plate laser-engraved to depict a QR code; and/or a fiberglass or flexible PCB with inductive coil, antenna, and integrated circuit loaded with a unique identifier, which together form an RFID tag.

4. Backing Plate

In one implementation, the backing plate 130 includes: a rectilinear base, such as a square base or square base with fileted or chamfered corners; and a cylindrical boss extending rearward from the base and defining an internal bore that defines a tag receiver 132 configured to receive and constrain a barb 122 of a tag.

Once the backing plate 130 and a corresponding tag are assembled over a rodent's ear, the cylindrical boss can also protect the barb 122 of the tag 120 from access (e.g., chewing) by other rodents.

5. Tray

As shown in FIGS. 4, 5, 8A, and 8B, the tray 110 defines one or more rows of tag receptacles 112, wherein each tag receptacle 112 is configured to: receive and retain a tag and a corresponding backing plate; and locate the barb 122 of the tag 120 coaxial with the tag receiver 132 of the corresponding backing plate with the barb 122 decoupled (i.e., withdrawn) from this tag receiver 132. For example, the tray 110 can include an injection molded polymer structure defining two rows of ten tag receptacles 112 on opposing sides of the tray 110.

In one implementation, a tag receptacle 112 defines a rectangular pocket 113 extending longitudinally into a side of the tray 110 by slightly greater than (e.g., 10% greater than) the width of the tag 120 and backing plate. The tag receptacle 112 can also define a barb slot 114: arranged over and centered laterally across the pocket 113; including a tapered lead-in to receive the barb 122 of a tag; and including a shoulder receiver behind the tapered lead-in can be configured to constrain the shoulder 124 of a tag. The tag receptacle 112 can also include a set of reliefs around the barb slot 114 to form a flexure or spring around the shoulder receiver, thereby enabling the shoulder receiver to: deform around a shoulder 124 of a tag as the tag is loaded into the barb slot 114; and then spring back into a nominal position to retain the shoulder 124 of the tag with the barb tip 123 of the tag located below the barb slot 114, extending into the pocket 113, and retaining the tag in the barb slot 114. The tag receptacle 112 can further include a boss guide 116 extending forward from a rear of the pocket 113 and configured to mate with and laterally constrain the boss of a backing plate within the pocket 113 such that the tag receiver 132—defined by a bore running through the boss—is approximately centered with the shoulder receiver of the barb slot 114 and thereby approximately coaxial with the barb 122 of a tag located in the tag receptacle 112. The tag receptacle 112 can also include a backing plate support tab 115 arranged on the bottom of the pocket 113 below (and coaxial with) the shoulder receiver of the barb slot 114 and configured to vertically support the backing plate 130 within the tag receptacle 112.

For example, the tag receptacle 112 can include a relief below the pocket 113 to form a set of undercuts on the left and right bottom sides of the pocket 113, which can vertically locate the lower forks 161 of an applicator 140, as described below, within the pocket 113. The left and right sides of the pocket 113 can laterally locate the lower forks 161 of the applicator 140 within the pocket 113. The backing plate support tab 115 can include a beam located below the boss guide 116, extending forward from the rear of the pocket 113, and terminating approximately coaxially with the barb slot 114. Therefore, in this example, when the barb 122 of a tag is loaded into the barb slot 114 of a tag receptacle 112 and when a backing plate is loaded into a pocket 113 of the tag receptacle 112, the backing plate support tab 115 can support the rear of the boss of the backing plate 130 and drive the backing plate 130 upward toward the tag such that the barb 122 of the tag inserts partially into the tag receiver 132 of the backing plate 130, thereby coaxially constraining the backing plate 130 on the tag and retaining the backing plate 130 within the pocket 113. Furthermore, the boss guide 116 can laterally constrain the boss of the backing plate 130 and the rear of the pocket 113 angularly locates the adjacent edge of the backing plate 130.

The barb slot 114—which includes a flexure or living spring that retains the barb 122 of the tag—can also deform around the barb 122 to enable a user to manually withdraw a tag out of the tag receptacle 112, such as both parallel and perpendicular to the axis of the barb 122.

Thus, in the foregoing example, the backing plate 130 is fully constrained and retained in the pocket 113 without contacting the left and right sides of the pocket 113, thereby yielding greater space for the lower tip of the applicator 140 to insert into a pocket 113 around the backing plate 130. More specifically, the vertical height of the pocket 113—that is, a vertical distance from the top of the backing plate support tab 115 to the base of the barb slot 114 at the top of the pocket 113—can be slightly less than (e.g., 90% of) the sum of the heights of the backing plate 130 and the barb tip 123 of the tag such that the barb tip 123 partially inserts into the tag receiver 132 of the backing plate 130 when the tag and the backing plate 130 occupy the tag receptacle 112. Therefore, when the backing plate 130 is loaded into the pocket 113 after the barb 122 of the tag is loaded into the barb slot 114, the backing plate support tab 115—which defines a cantilevered structure with narrow cross-section—can: deflect downwardly as the backing plate 130 rides down the barb tip 123; and then spring back to its nominal position to retain the backing plate 130 around the barb tip 123 once the barb tip 123 inserts into the tag receiver 132. (Furthermore, the boss guide 116 can center the backing plate 130 laterally within the pocket 113 as the backing plate 130 enters the pocket 113 and as the tag receiver 132 approaches the barb tip 123.)

Alternatively, the vertical height of the pocket 113 can be slightly less than (e.g., 98% of) the heights of the backing plate 130. Accordingly, the backing plate support tab 115 can; deflect downwardly to accommodate the backing plate 130 when inserted into the pocket 113; and can apply an upward force to the backing plate 130 to vertically constrain and retain the backing plate 130 against the top of the pocket 113. Concurrently, the boss guide 116 can laterally constrain the backing plate 130 to maintain the tag receiver 132 of the backing plate 130 coaxial with the barb 122, maintain an offset between the sides of the backing plate 130 and the sides of the pocket 113, and thus provide more room for the lower tongue 160 of the applicator 140 to enter the pocket 113 and engage the backing plate 130.

6. Manufacturing: Overmolded Visual Identifier Tags with Contiguous Frame

In one variation, a set of tags 120 are molded over identifier elements that define visual identifiers and that are located within a contiguous frame.

Figure 6:
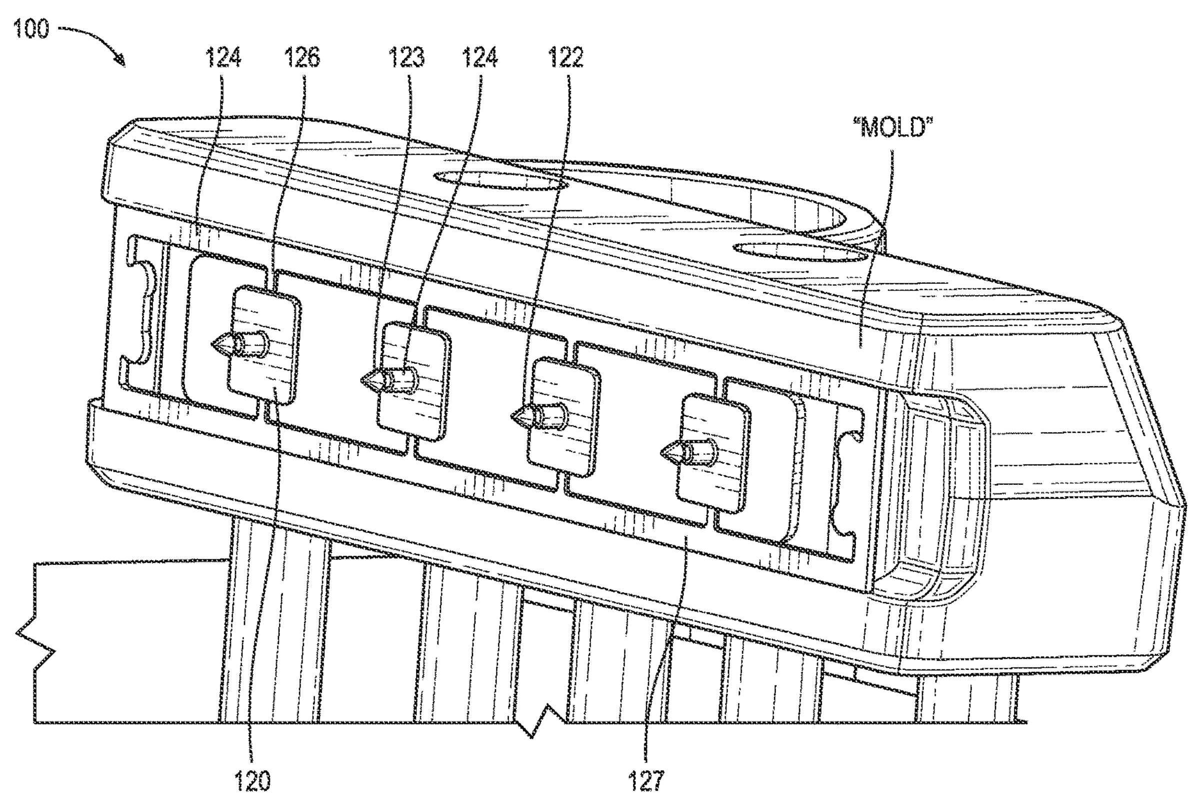
FIG. 6 is a schematic representation of one variation of the system.

In one implementation shown in FIG. 6, an aluminum sheet is punched, stamped, laser cut, or waterjet cut, etc. to form a pre-mold identifier element assembly that includes: two parallel and offset trees 125; and a row of rectilinear (e.g., square) identifier elements located between the trees 125, wherein each identifier element is supported off of and is connected to each tree 125 by a pair of tabs 126. In this implementation, the trees 125 therefore form a "frame" that locates the identifier elements via pairs of tabs 126. The pre-mold identifier element assembly is then loaded into an injection mold such that: the trees 125 seat in corresponding tree 125 receptacles and are constrained within the mold; and the tabs 126 extend through apertures in the mold to locate identifier elements within tag base 121 cavities within the mold.

A polymer (e.g., nylon) is then injected into the mold to fill the tag base 121 cavities around the identifier elements and thus form an overmolded tag assembly 127 that includes: two parallel and offset trees 125; a row of tag bases 121—overmolded around identifier elements—located between the trees 125, wherein each tag base 121 is supported off of and is connected to each tree 125 by a pair of tabs 126.

In a similar implementation, an aluminum reel is punched, stamped, laser cut, or waterjet cut, etc. to form a continuous reel: two parallel and offset trees 125; and rectilinear (e.g., square) identifier elements located between the trees 125, wherein each identifier element is supported off of and is connected to each tree 125 by a pair of tabs 126. This is then loaded into an injection molding machine, a first end of the reel is extended into an injection mold such that: a first set of identifier elements and a first length of the trees 125 seat within the injection mold. A polymer is then injected into the cavity of the injection mold around the identifier elements; the reel is rejected just behind this overmolded tag assembly 127; the overmolded tag assembly 127 is ejected from the injection mold; a next segment of the reel is loaded into the injection mold; and this process is repeated to form a next instance of the overmolded tag assembly 127.

6.1 Tray Loading

In this implementation, the tag bases 121 can be separated from the trees 125 and tabs 126 in the overmolded tag assembly 127. These loose tag bases 121 can then be loaded into tag receptacles 112 in the tray 110, such as manually or with a vacuum-tipped pick-and-place system.

Alternatively, the pre-mold identifier element assembly can locate identifier elements at a pitch offset equal to a pitch distance between tag receptacles 112 within a single row of tag receptacles 112 in the tray 110. Thus, in this implementation, a first tree 125 can be trimmed and removed from the pre-mold identifier element assembly. The tag bases 121—still connected and located by the second tree 125—can then be loaded into the tag receptacles 112 in the tray 110 (e.g., by inserting barbs 122 of the tag bases 121 into the tag receptacles 112). The second tree 125 can then be trimmed and removed from the tag bases 121 to free the individual tag bases 121 now loaded in the tray 110.

For example, prior to insertion of the overmolded tag assembly 127 into the tray 110, the tabs 126 between the tag bases 121 and the first tree 125 can be cut: manually with a pair of snips; manually or automatically with a linear shear; or automatically with a laser or waterjet cutter. Similarly, following insertion of the overmolded tag assembly 127 into the tray 110, the tabs 126 between the tag bases 121 and the first tree 125 can be cut manually with a pair of snips, with a linear shear, or with a laser or waterjet cutter. Alternatively, the second tree 125 can be folded to fatigue and then break these tabs 126 to free the tag bases 121.

6.2 Visual Identifier Application

In this implementation, prior to insertion into the mold, the pre-mold identifier element assembly can be loaded into an engraving machine, which can etch or scribe each identifier element with a unique visual identifier (e.g., a QR code, a barcode). Alternatively, after extraction from the mold, the overmolded tag assembly 127 can be loaded into the engraving machine, which can etch or scribe the exposed surfaces of the identifier elements in the overmolded tag assembly 127 with unique visual identifiers. Therefore, in these implementations, because the identifier elements are rigidly located in the pre-mold identifier element assembly, these identifier elements can be accurately and repeatably located within the engraving machine, thereby enabling the engraving machine to apply unique identifiers squarely across a maximum area of each identifier element.

Yet alternatively, after the tag bases 121 are loaded into the tray 110, the tray no can be loaded into the engraving machine, which can etch or scribe the exposed surfaces of the identifier elements in these tag bases 121 with unique visual identifiers. Therefore, in this implementation, unique visual identifiers can be applied to the identifier elements after manufacture and tray 110 loaded, such as by a scientist at a laboratory. Additionally or alternatively, in this implementation, unique visual identifiers can be applied only to exposed surfaces of the identifier elements after overmolding, thereby avoiding damage or obfuscation of these visual identifiers during overmolding, trimming, and loading into the tray 110.

Later, the visual identifiers on these tag bases 121 can be read with optical sensors, such as with color cameras arranged over a rodent cage or with a camera integrated into a mobile computing device (e.g., a smartphone)

7. Manufacturing: Overmolded Wireless Identifier Tags with Contiguous Frame

In another implementation, discrete groups of antennas, inductive charging coils, and integrated circuit pads are fabricated on a flexible or rigid PCB. A set of integrated circuits loaded (or "flashed") with unique identifiers are soldered onto integrated circuit pads on the PCB. The PCB is then punched, stamped, laser cut, or waterjet cut, etc. to form a pre-mold identifier element assembly that includes: two parallel and offset trees 125; and a row of rectilinear (e.g., square) identifier elements located between the trees 125, wherein each identifier element is supported off of and is connected to each tree 125 by a pair of tabs 126 and includes an integrated circuit, an antenna, and an inductive charging coil. The trees 125 therefore form a "frame" that locates the identifier elements via pairs of tabs 126.

This pre-mold identifier element assembly is then loaded into an injection mold and overmolded within a polymer to form an overmolded tag assembly 127, as described above. The overmolded tag assembly 127 can then be trimmed and/or individual tag bases 121 from this overmolded tag assembly 127 can be loaded into a tray 110, as described above. Later, the identifiers loaded onto these tag bases 121 can be interrogated with wireless readers, such as with a handheld RFID reader or an RFID reader integrated into (or arranged below) the base of a rodent cage 8. Manufacturing: Double-Row Overmolded Visual Identifier Tags In another implementation, a pre-mold identifier element assembly is fabricated or assembled, such as described above, to include: three parallel and offset trees 125; a first row of identifier elements located between a first and second (i.e., middle) tree 125, wherein each of these identifier elements is supported off of and is connected to each of the first and second trees 125 by a pair of tabs 126; and a second row of identifier elements located between the second and third trees 125, wherein each of these identifier elements is supported off of and is connected to each of the second and third trees 125 by a pair of tabs 126.

In this implementation, the lateral pitch between identifier elements in the rows of identifier elements can approximate the pitch distance between tag receptacles 112 in one row of tag receptacles 112 in the tray 110; and the longitudinal pitch between rows of identifier elements in the pre-mold identifier element assembly can approximate the longitudinal pitch distance between adjacent rows of tag receptacles 112 in the tray 110. Therefore, identifier elements in the single pre-mold identifier element assembly can be overmolded with a polymer to form two parallel rows of tag bases 121 supported between the three trees 125.

This overmolded tag assembly 127 can then be loaded onto the tray 110 to seat tag bases 121 into their tag receptacles 112 in the tray 110, and the trees 125 can then be trimmed to complete loading of tag bases 121 into two rows of tag receptacles 112 in the tray 110.

9. Manufacturing: RFID Tag Tape

In another implementation, a backing strip (or "tape")—populated with RFID tags—is loaded directly into an injection mold with these RFID tags located (e.g., centered) within tag base 121 cavities in the injection mold. A polymer is then injected into the mold to overmold a set of tags 120 around these RFID tags.

In this implementation, a row of tags—still connected via the backing strip—can then be loaded into the tray 110, as described above, and the backing strip is then torn off of the tags to free these tags in the tray 110.

10. Manufacturing: Backing Plate

In the foregoing implementations, a set of backing plates 130 can be similarly injection molded in a group, broken or cut from a tree 125, and then individually loaded into tag receptacles 112 in the tray 110 such that the tag receiver 132 of each backing plate is coaxial with the barb 122 of its corresponding tag base 121.

In another implementation, a set of backing plates 130 are injection molded around identifier elements that are connected by a tree 125 and a set of gates. The tree 125 and gates align these backing plates in a single row and at a pitch offset equal to a pitch distance between tag receptacles 112 within a single row of tag receptacles 112 in the tray 110. Accordingly, in this implementation, after the tree 125 and set of backing plates 130 are removed from the injection model, they can be inserted en masse into the tag receptacles 112 on one side of the tray 110. The gates between these backing plates and the tree 125 can then be cut, such as with manual snips, a linear shear, a die, or a laser or waterjet cutter.

11. Applicator

Figure 2:
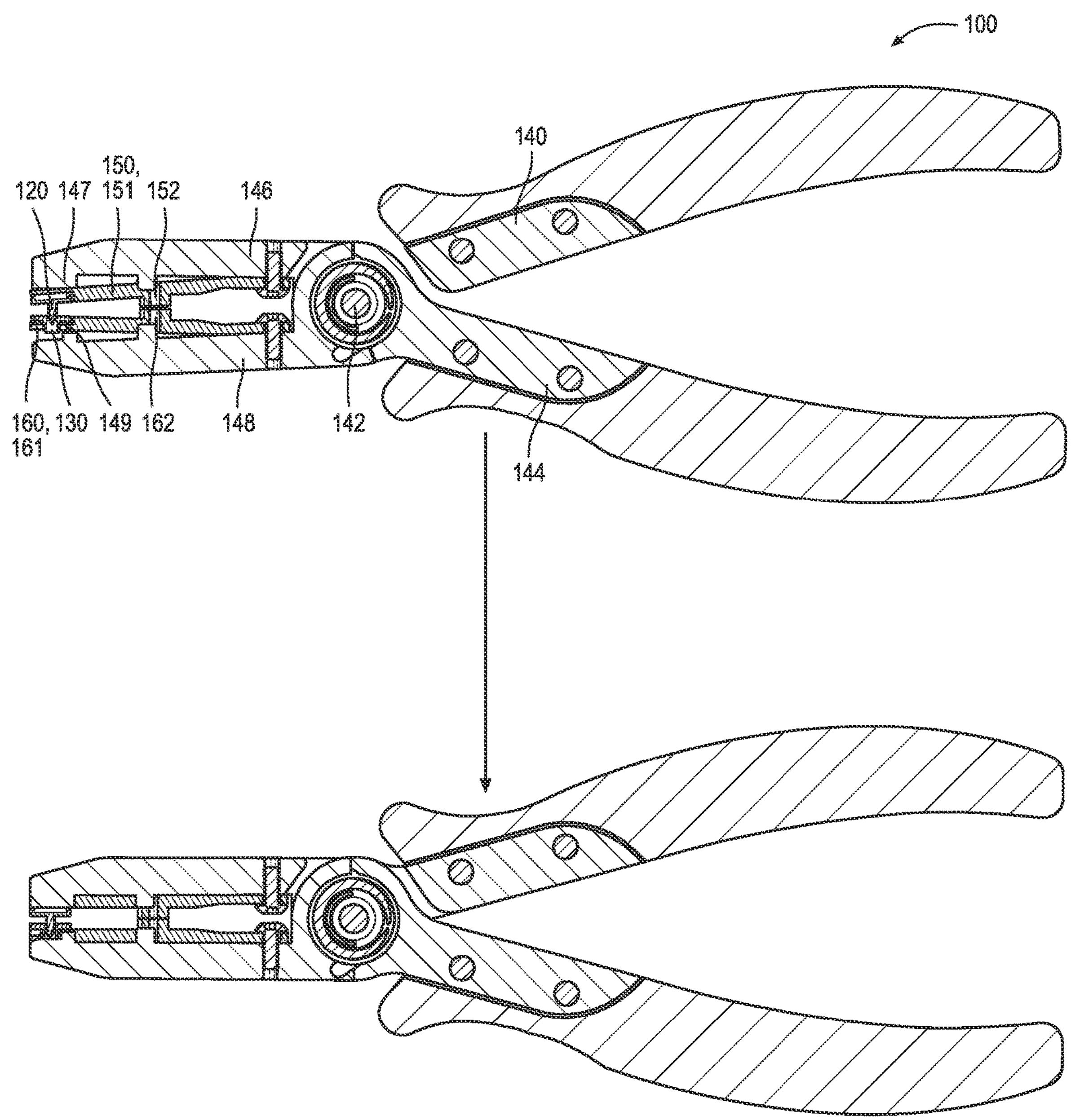
FIG. 2 is a flowchart representation of one variation of the system.
Figure 3:
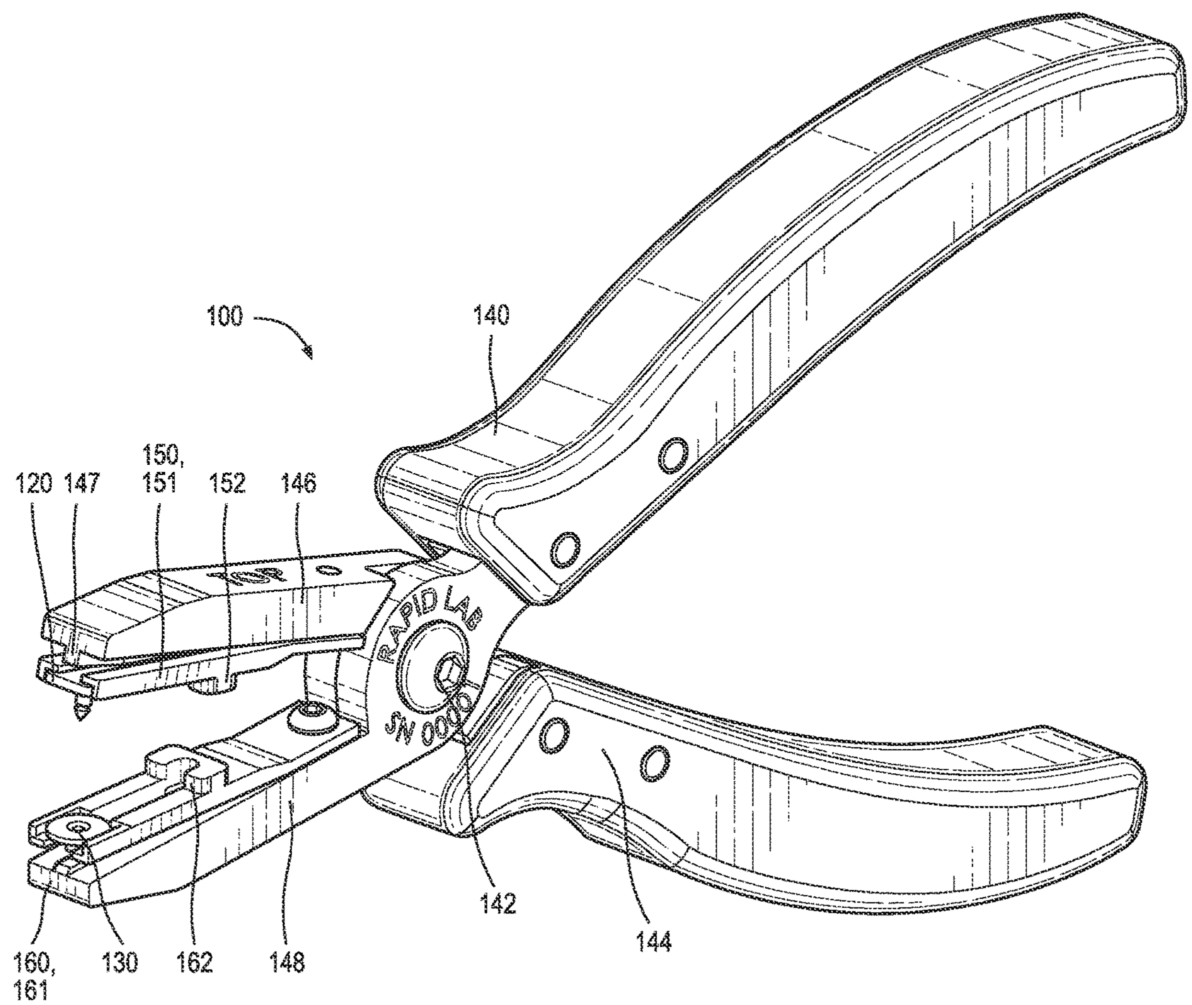
FIG. 3 is a schematic representation of one variation of the system.
Figure 4:
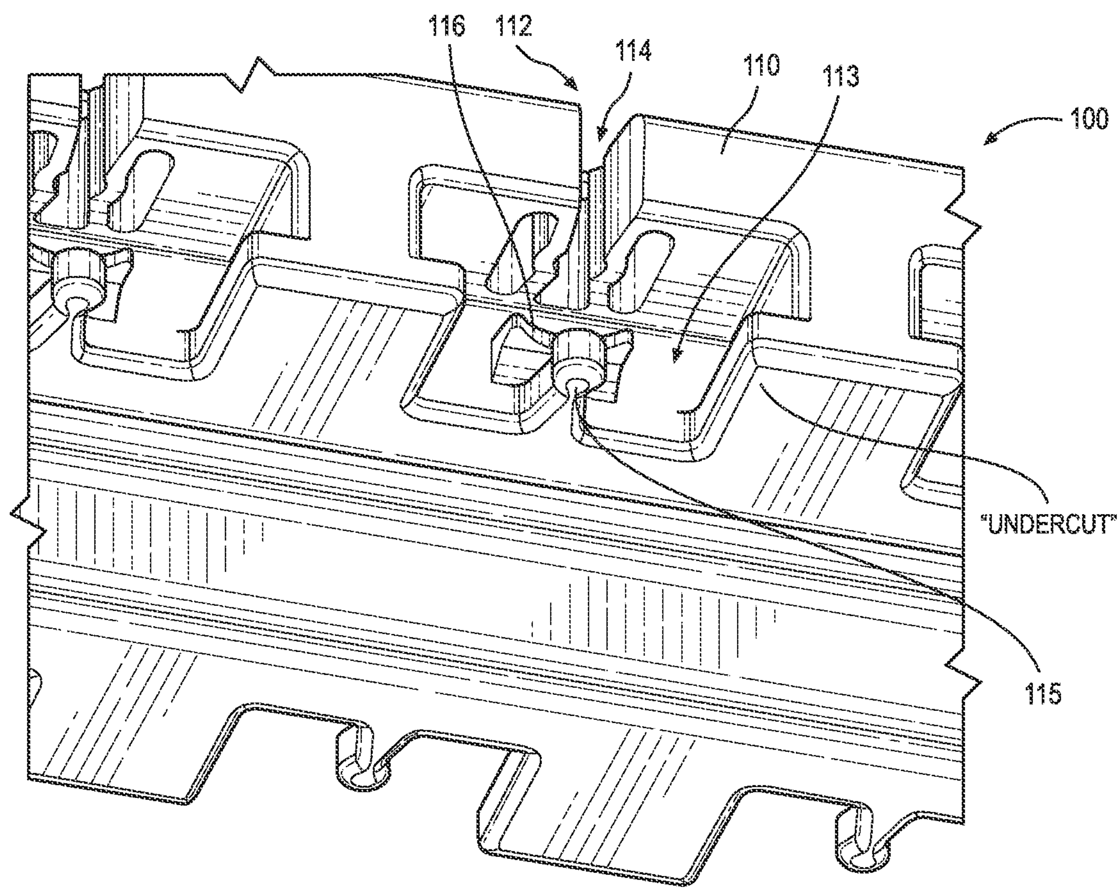
FIG. 4 is a schematic representation of one variation of the system.
Figure 5:
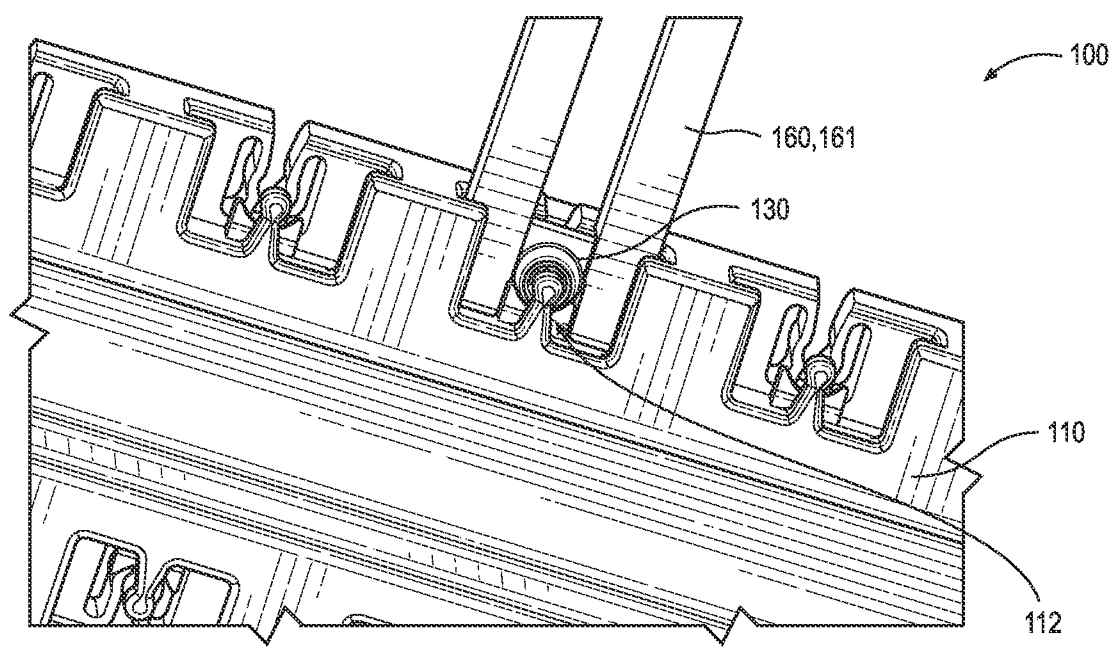
FIG. 5 is a schematic representation of one variation of the system.
Figure 9:
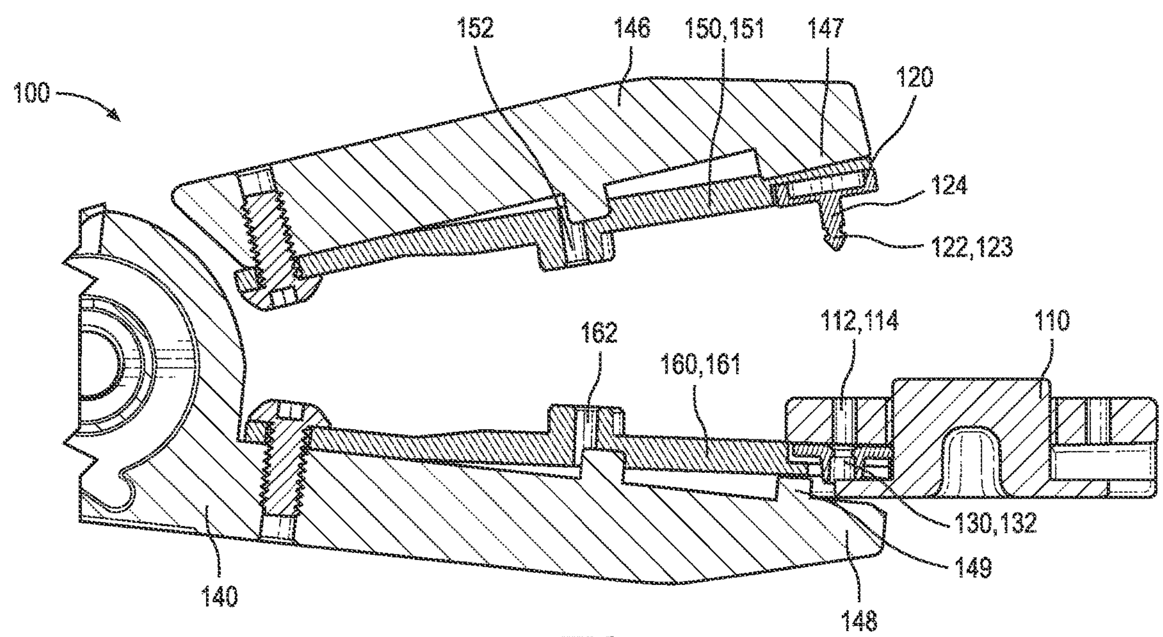
FIG. 9 is a schematic representation of one variation of the system.

In one implementation shown in FIGS. 1-3, the applicator 140 includes a set of pliers 144 in a grip-to-close configuration and including: an upper jaw 146 fore of a pivot 142 and defining a tag ejection boss 147 proximal a tip of the upper jaw 146; and a lower jaw 148 fore of a pivot 142 and defining a backing plate ejection boss 149 proximal a tip of the lower jaw 148. The applicator 140 also includes an upper tongue 150 including: a proximal end mounted to the upper jaw 146 proximal the pivot 142; a distal end defining a pair of upper forks 151 extending on each lateral side of the tag ejection boss 147 and configured to splay outwardly to receive a tag, defining a lower seat configured to engage opposing lateral sides of the tag, and biased downwardly off of the tip of the upper jaw 146; and a set of upper stops 152 extending downwardly from the pair of upper forks 151 between the proximal end and the distal end of the upper tongue 150. The applicator 140 further includes a lower tongue 160 including: a proximal end mounted to the lower jaw 148 proximal the pivot 142; a distal end defining a pair of lower forks 161 extending on each lateral side of the backing plate ejection boss 149 and configured to splay outwardly to receive a backing plate, configured to insert into a pocket 113 of a tag receptacle 112 in the tray 110, defining a lower seat configured to engage opposing lateral sides of the backing plate 130, and biased upwardly off of the tip of the lower jaw 148; and a set of lower stops 162. The lower stops 162: extend upwardly from the pair of lower forks 161 between the proximal end and the distal end of the lower tongue 160; and are configured to engage the set of lower stops 162 during actuation of the set of pliers 144 to a) drive the distal end of the upper tongue 150 toward the tag ejection boss 147 to eject the tag from the pair of upper forks 151 and b) drive the distal end of the lower tongue 160 toward the backing plate ejection boss 149 to eject the backing plate 130 from the pair of lower forks 161. As shown in FIG. 9, during actuation of the set of pliers 144, the tag ejection boss 147 and the backing plate ejection boss 149 cooperate to: retain the tag following ejection from the pair of upper forks 151; retain the backing plate 130 following ejection from the pair of lower forks 161; and drive a barb 122 of the tag into a tag receiver 132 of the backing plate 130 to seat the barb 122 within the tag receiver 132.

11.1 Upper Tongue and Upper Jaw

In one implementation, the upper tongue 150 includes: a rear body defining a proximal end pinned (e.g., fastened with a threaded fastener) to the underside of the upper jaw 146 near the pivot 142 of the set of pliers 144; and a tongue section defining a pair of laterally-offset and split forks extending forward from the rear body.

In this implementation, the upper tongue 150 is machined, stamped, or otherwise processed to form an arch: such that the proximal end of the upper tongue 150 fastens to the upper jaw 146 near the pivot 142 of the set of pliers 144; and such that the distal end of the upper tongues 150 droops downwardly and is offset below the tip of the upper jaw 146 of the set of pliers 144. (Conversely, the underside of the upper jaw 146 near the pivot 142 of the set of pliers 144 can be machined stamped, forged, or otherwise fabricated to form an angled seat that locates the upper tongue 150 at an angle on the upper jaw 146: such that the proximal end of the upper tongue 150 fastens squarely to the upper jaw 146 near the pivot 142 of the set of pliers 144; and such that the distal end of the upper tongues 150 droops downwardly and is offset below the tip of the upper jaw 146 of the set of pliers 144.)

The upper tongue 150 also includes a set of upper stops 152 extending downwardly from the pair of forks (or from a center section of the upper tongue 150 between the rear body and the tongue section). The upper stops 152 are configured: to clamp against the lower stops 162 of the lower tongue 160; to bend the distal end of the upper tongue 150 toward the tip of the upper jaw 146 of the set of pliers 144; and to a set a minimum distance between the upper and lower tongues 150, 160—greater than a maximum ear thickness of a target rodent (e.g., lab mice)—when the set of pliers 144 are gripped and closed, thereby preventing damage to a rodent's ear when tagged with the applicator 140.

The forks defines seats configured to receive the sides of a tag base 121 and spanning a lateral distance slightly (e.g., 2%) less than a nominal width of the tag base 121 such that: the base of the tag interferes with the seats in the forks and causes the forks to splay laterally outwardly to receive and clamp against the tag base 121. The forks also: define tapered lead-ins at the fronts of the seats to ease insertion of the tag base 121 into the seat; and rear stops configured to prevent longitudinal translation of the tag base 121 rearward toward the pivot 142 of the set of pliers 144. Furthermore, the forks define an aperture (or a longitudinal "slot") configured to receive a tag ejection boss 147—extending downwardly from the underside of the distal end of the upper jaw 146—as the set of pliers 144 are gripped and closed. Accordingly, the tag ejection boss 147 can drive a tag base 121—of a tag occupying the seats in the forks—downward, out of the upper tongue 150, and seat a barb 122 of the tag in a tag receiver 132 of a corresponding backing plate located below by the lower jaw 148 of the set of pliers 144.

In one variation, the tag ejection boss 147 includes an elongated structure or a pair of longitudinally-offset studs configured to contact the fore and aft edges of a tag base 121—occupying the seats of the forks—and to apply a downward force to these edges of the tag base 121 rather than the center of the base as the set of pliers 144 are gripped and closed in order to prevent damage to a visual or digital identifier contained near the center of the tag base 121.

11.2 Lower Tongue

The lower tongue 160 can define a similar structure that is similarly mounted to the lower jaw 148 of the pliers 144.

In particular, the lower tongue 160 can include: a rear body defining a proximal end pinned (e.g., fastened with a threaded fastener) to the underside of the lower jaw 148 near the pivot 142 of the set of pliers 144; and a tongue section defining a pair of laterally-offset and split forks extending forward from the rear body. In this implementation, the lower tongue 160 is machined, stamped, or otherwise processed to form an arch: such that the proximal end of the lower tongue 160 fastens to the lower jaw 148 near the pivot 142 of the set of pliers 144; and such that the distal end of the lower tongues 150, 160 lift upwardly and is offset above the tip of the lower jaw 148 of the set of pliers 144.

The lower tongue 160 also includes a set of lower stops 162 extending upwardly from the pair of forks (of from a center section of the lower tongue 160 between the rear body and the tongue section). The lower stops 162 are configured: to clamp against the upper stops 152 of the upper tongue 150; to bend the distal end of the lower tongue 160 toward the tip of the lower jaw 148 of the set of pliers 144; and to a set a minimum distance between the upper and lower tongues 150, 160—greater than a maximum ear thickness of a target rodent (e.g., lab mice)—when the set of pliers 144 are gripped and closed, thereby preventing damage to a rodent's ear when tagged with the applicator 140.

However, when the set of pliers 144 are open, the distal end of the forks can be offset above the tip of the lower jaw 148 by a distance (slightly) greater than the seats and undercut sections of a pocket 113 in the tray 110 such that: the fork can insert into the pocket 113 to receive a backing plate; the tip of the lower jaw 148 of the pliers 144 locates under the seats and undercut sections of the pocket 113; and the seats and undercut sections of the pocket 113 prevent the forks from deflecting toward the tip of the lower jaw 148, thereby preventing the backing plate ejection boss 149 on the lower jaw 148 from ejecting the backing plate 130 from the forks if the pliers 144 are closed as the pliers 144 are loaded with a tag and backing plate.

11.2 Swappable Tongues

Figure 7:
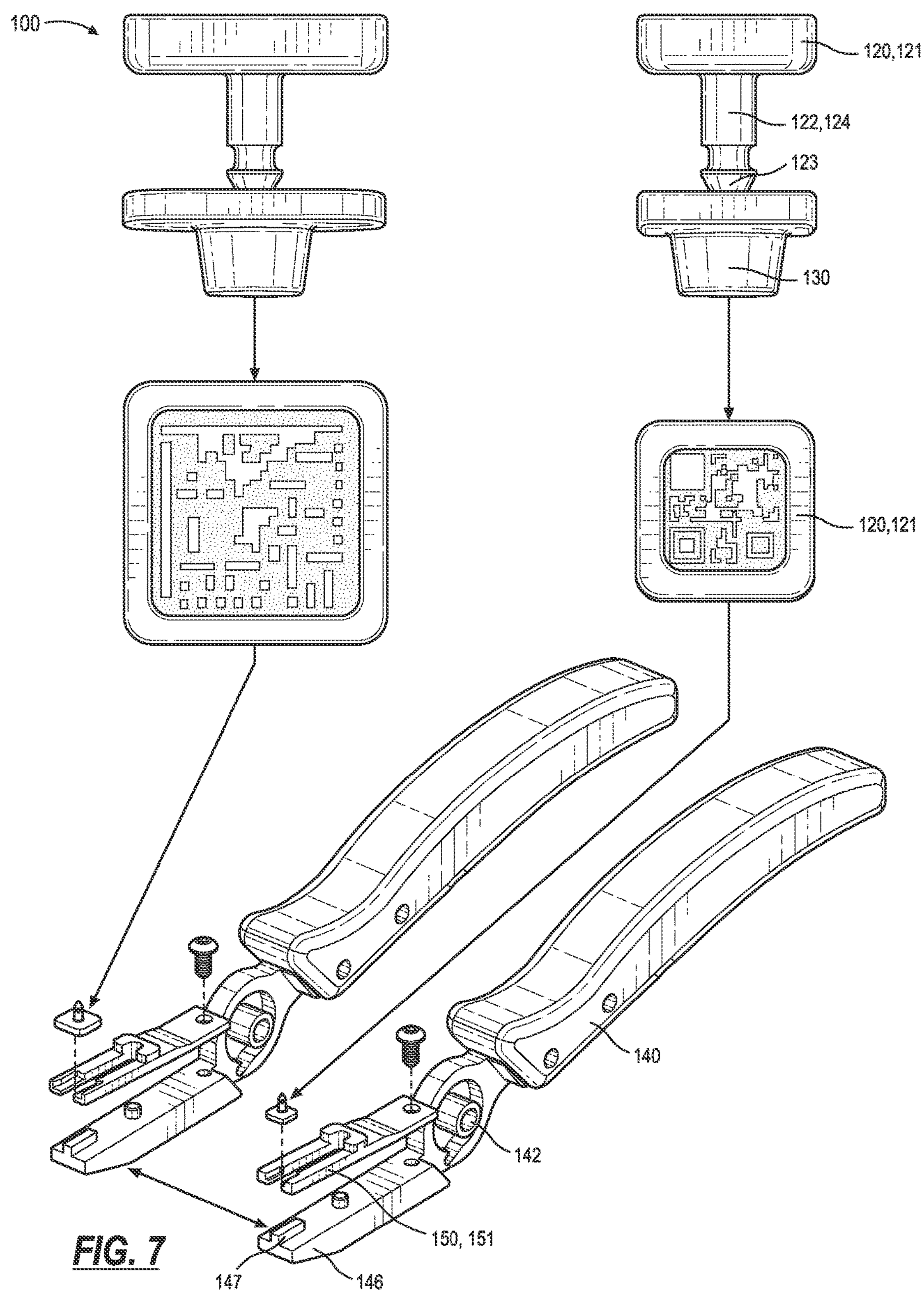
FIG. 7 is a flowchart representation of one variation of the system.
Figure 8A:
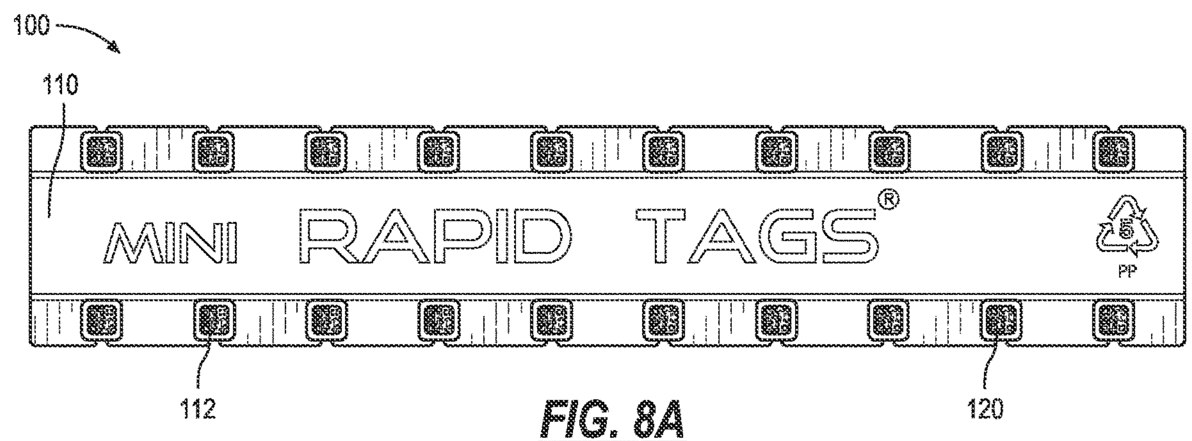
FIGS. 8A and 8B are schematic representation of one variation of the system.
Figure 8B:
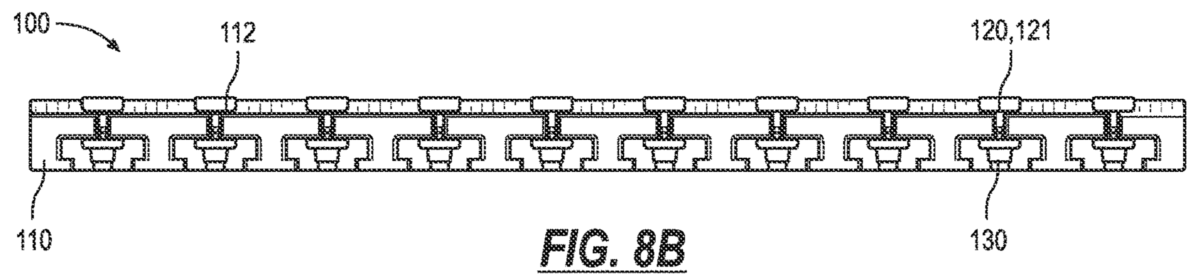

As shown in FIG. 7, the tongues of the applicator 140 can be configured: to fasten to the rears of the upper and lower jaws 148 of the applicator 140 near the pivot 142 with one threaded fastener per jaw; and to be replaced by a similar set of jaws configured to engage tags of a different size. For example, a first set of tongues can be installed on the applicator 140 to configure the applicator 140 to interface with 3.5-millimeter-wide tags for application onto mice between three and five days of age. Later, a second set of tongues can be installed on the applicator 140 to configure the applicator 140 to interface with 5-millimeter-wide tags for application onto mice between greater than twelve days of age.

As a person skilled in the art will recognize from the previous detailed description and from the figures and claims, modifications and changes can be made to the embodiments of the invention without departing from the scope of this invention as defined in the following claims.

We claim:

1. An applicator comprising:
- a set of pliers in a grip-to-close configuration and including:
  - an upper jaw, distal of a pivot, defining a tag ejection boss proximal a tip of the upper jaw; and
  - a lower jaw, distal of the pivot, defining a backing plate ejection boss proximal a tip of the lower jaw;
- an upper tongue comprising:
  - a proximal end mounted to the upper jaw proximal the pivot;
  - a distal end;
    - defining a pair of upper forks extending on each lateral side of the tag ejection boss and configured to splay outwardly to receive a tag;
    - defining a lower seat configured to engage opposing lateral sides of the tag; and
    - biased downwardly off of the tip of the upper jaw; and
  - a set of upper stops extending downwardly from the pair of upper forks between the proximal end and the distal end of the upper tongue;
- a lower tongue comprising:
  - a proximal end mounted to the lower jaw proximal the pivot;
  - a distal end:
    - defining a pair of lower forks extending on each lateral side of the backing plate ejection boss and configured to splay outwardly to receive a backing plate;
    - configured to insert into a pocket of a tag receptacle in a tray;
    - defining a lower seat configured to engage opposing lateral sides of the backing plate; and
    - biased upwardly off of the tip of the lower jaw; and
  - a set of lower stops:
    - extending upwardly from the pair of lower forks between the proximal end and the distal end of the lower tongue; and
    - configured to engage the set of upper stops during actuation of the set of pliers to:
      - drive the distal end of the upper tongue toward the tag ejection boss to eject the tag from the pair of upper forks; and
      - drive the distal end of the lower tongue toward the backing plate ejection boss to eject the backing plate from the pair of lower forks; and
- wherein, during actuation of the set of pliers, the tag ejection boss and the backing plate ejection boss cooperate to:
  - retain the tag following ejection from the pair of upper forks;
  - retain the backing plate following ejection from the pair of lower forks; and
  - drive a barb of the tag into a receiver of the backing plate to seat the barb within the receiver.

2. The applicator of claim 1, wherein the applicator is configured to drive the barb of the tag into an appendage of an animal to pierce the appendage.

3. The applicator of claim 1, wherein the applicator is configured to insert into a tag receptacle in the tray to:

retrieve a tag and a backing plate from the tag receptacle; and maintain a bore of the backing plate coaxial with the barb of the tag.

4. The applicator of claim 1, wherein the upper tongue and the lower tongue are configured to:

insert into a tag receptacle in the tray;

concurrently engage the tag and the backing plate in the tag receptacle; and concurrently extract the tag and the backing plate from the tag receptacle.

5. The applicator of claim 1, wherein the set of upper stops and the set of lower stops cooperate to:

block application of force into an appendage of an animal during actuation of the set of pliers to seat the barb within the receiver of the backing plate.

6. The applicator of claim 1:

wherein the set of upper stops extend from the upper tongue by a first distance;

wherein the set of lower stops extend from the lower tongue by a second distance; and wherein a sum of the first distance and the second distance defines a minimum distance between the upper tongue and the lower tongue.

7. The applicator of claim 1:

wherein the set of lower stops are configured to:

bend the distal end of the lower tongue toward the tip of the lower jaw; and wherein the set of upper stops are configured to:

bend the distal end of the upper tongue toward the tip of the upper jaw; and cooperate with the set of lower stops to set a minimum distance between the upper and lower tongues when the set of pliers are closed.

8. The applicator of claim 1, wherein the pair of upper forks of the upper tongue define:

a set of rear stops configured to prevent longitudinal translation of the tag toward the pivot of the set of pliers; and an aperture configured to receive an ejection boss when the set of pliers are closed.

9. The applicator of claim 1, wherein the upper forks of the upper tongue define seats:

configured to receive sides of the tag; and spanning a lateral distance less than a nominal width of the tag.

10. The applicator of claim 1:

wherein the tray defines a second seat offset by a first distance from an undercut section of the tray; and wherein a distal end of the lower forks of the lower tongue are offset above the tip of the lower jaw by a second distance greater than the first distance.

11. The applicator of claim 1, wherein the tag ejection boss of the upper jaw of the set of pliers defines a pair of longitudinally-offset studs configured to:

contact a fore edge and an aft edge of the tag; and apply a downward force to the fore edge and the aft edge of the tag.

* * * * *